(12) United States Patent
Barker

(10) Patent No.: US 7,414,739 B2
(45) Date of Patent: Aug. 19, 2008

(54) CALIBRATION SYSTEM FOR SAWMILL SCANNING SYSTEMS

(75) Inventor: Lawrence D. Barker, Enumclaw, WA (US)

(73) Assignee: EB Associates, Enumclaw, WA (US)

( * ) Notice: Subject to any disclaimer, the term of this patent is extended or adjusted under 35 U.S.C. 154(b) by 0 days.

(21) Appl. No.: 11/277,806

(22) Filed: Mar. 29, 2006

(65) Prior Publication Data

US 2007/0236680 A1    Oct. 11, 2007

(51) Int. Cl.
 *G01B 11/28* (2006.01)
(52) U.S. Cl. ............... 356/630; 356/5.13; 250/559.27; 250/559.38; 324/229
(58) Field of Classification Search ........... 356/5.13
 See application file for complete search history.

(56) References Cited

U.S. PATENT DOCUMENTS 3,565,531 A * 2/1971 Kane et al. ............. 356/631
6,836,331 B2 * 12/2004 Reis et al. ............... 356/429
6,967,726 B2 * 11/2005 King et al. ............... 356/630

\* cited by examiner

*Primary Examiner*—Thomas H. Tarcza
*Assistant Examiner*—Timothy A Brainard
(74) *Attorney, Agent, or Firm*—Jensen & Puntigam, P.S.

(57) ABSTRACT

The method for calibration of a single point laser system used in a measuring system for wood boards in a sawmill includes the steps of storing two orthogonal dimensions of a calibration bar, the values of the two dimensions being different from each other; placing the calibration bar within the scan zone of the measuring system, which is between two opposing lasers; measuring the distance to the calibration bar from each laser in a first dimension, and rotating the bar to its orthogonal dimension and again measuring the distance to the bar from each of the lasers. The distance information to the calibration bar and the known dimensional values of the bar in the two dimensions are then used to determine that a calibration bar is present rather than a wood board to be measured. If the presence of a calibration bar is confirmed, then the distance values and the dimension values are used to determine the actual distance between the two lasers. This information is then compared with the last known laser distance to provide calibration information for the system.

5 Claims, 3 Drawing Sheets

CALIBRATION SYSTEM FOR SAWMILL SCANNING SYSTEMS

TECHNICAL FIELD

This invention relates to the calibration of single point lasers that are used in the measurement of the size of lumber boards in sawmills, or other objects in other applications.

BACKGROUND OF THE INVENTION

Single point lasers are used in measurement systems in sawmills to measure various dimensions of a board after it has been through the sawing process. Information from the measurement system can then be analyzed to better control the sawing process for subsequent boards. Measurement of the width of a board, for instance, requires two scanners, positioned on opposite sides of the width dimension of the board. The lasers must be a known, fixed distance apart, with the individual lasers providing distance information from the laser to the edge of the board. With this information, the width dimension of the board can be calculated by the measurement system, as is well known in the art.

Accurate calculation, however, requires regular calibration of the system, which takes into account possible changes in the position of the lasers. A slight change in position can occur in various ways, including temperature change or by the laser support bracket being hit, as examples. Calibration can be carried out manually or automatically. Both methods involve temporarily stopping the sawing process and using a calibration bar. The manual system requires significant involvement by the operator relative to the computer calculations. The automatic system is programmed to look for an object close to the calibration bar size. When the calibration bar is recognized by the automatic system, the system is re-calibrated from the data provided by the lasers to provide a calculated dimension result which is equal to the actual dimension of the calibration bar being scanned. A difficulty with the automatic calculation, however, using a calibration bar, is that the calibration bar must be quite different in the dimensions being scanned than an actual sawn board. If the system is accidentally calibrated using a sawn board, the entire measurement system will be adversely affected. This is, of course, undesirable.

Hence, it is desirable to have an automatic calibration arrangement for board scanning systems in sawmills or similar applications where calibration is reliably and quickly carried out on a calibration bar, with a minimum amount of operator involvement.

SUMMARY OF THE INVENTION

Accordingly, disclosed herein is a method of calibration for single point laser systems which are used to calculate a selected dimension of an object, comprising the steps of: storing at least two known dimensional aspects of a calibration bar member, the two dimensional aspects being different from each other; placing the calibration bar in an original orientation within a scan zone of the laser system having two lasers with the scan zone therebetween; determining the distance between each of the opposing lasers and the calibration bar in a first dimensional aspect; presenting a second dimensional aspect of the calibration bar to the two lasers within the scan zone; determining the distance between each of the two lasers, respectively, and the calibration bar in the second dimensional aspect; using the determined distances and the known values of the first and second dimensional aspects of the calibration bar to ensure that a calibration bar is being viewed by the lasers instead of another object; using the determined distance for the first and second dimensional aspects and the known dimensions of the calibration bar to obtain calibration information based on the distance between the two lasers; and calibrating the laser system based on the calibration information.

BEST MODE FOR CARRYING OUT THE INVENTION

One embodiment shown herein is an automatic calibration system for a two-scanner system used to measure a selected dimension of an object, for instance, a sawn wood board in a sawmill. Although the description herein, for purposes of illustration, will be directed toward the measurement of wood boards in a sawmill, it should be understood that the system can be used for scanning systems and scanning zones involving other objects, in which determination of dimensions is important.

Figure 1:
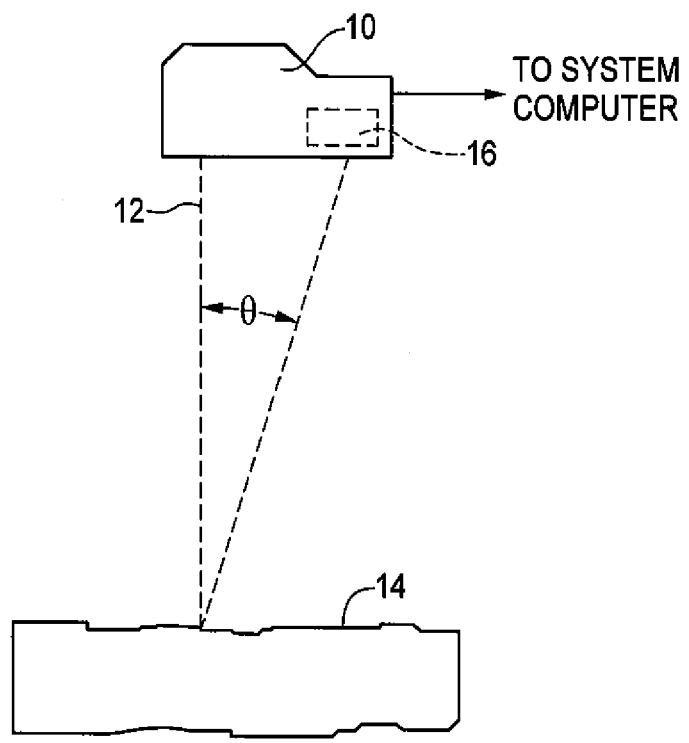
FIG. 1 is a simplified elevational view showing the scanning of an object, such as a wood board, using a laser.

FIG. 1 shows a single scanner 10 used in a typical two-scanner measurement system; the scanner 10 emits a laser beam, shown at 12, directed toward the object to be measured 14, such as a wood board. An appropriate scanner can be purchased from a variety of sources. One example of a high precision single point laser is the LRS-50, manufactured by Hermary Opto Electronics Inc. Other scanners which can be used are available from other commercial sources. Scanner 10 includes a camera 16 which views the point of contact of the laser beam with the board at a known angle θ. Information from both lasers in the system is then sent to the system computer, which could be located some distance (up to several hundred feet) from the lasers. The computer then uses known geometric principles to calculate the board dimension based on distance information from the lasers, respectively, to the edges of the board provided by the lasers.

The accuracy of the board dimension determination depends on the distance between the scanners and the target object. At larger distances, the accuracy decreases, so that it is desirable to maintain the lasers as close to the board as is practical. Five inches is very desirable, although distances up to 65 inches and even greater can still provide good results.

Figure 2:
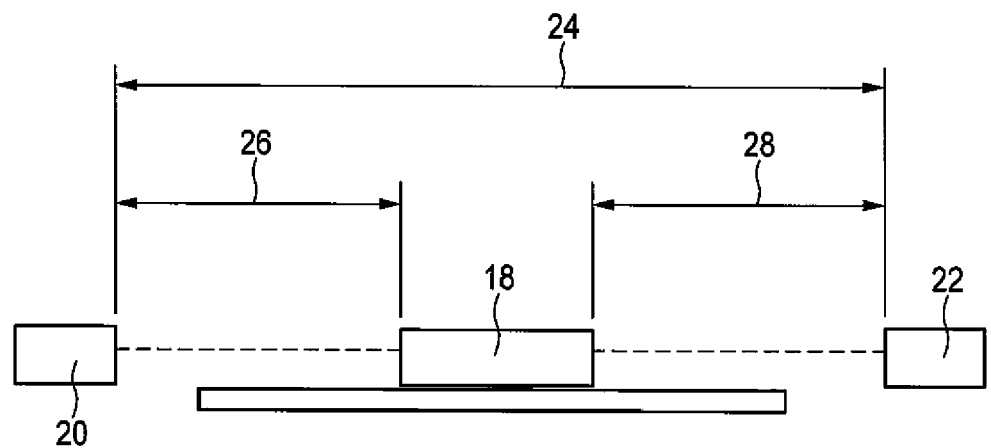
FIG. 2 is a diagram showing measurement of a calibration bar (or wood board) using two opposing scanners in two dimensions.

Using two scanners, as illustrated in FIG. 2, the thickness or width of a wood board 18 can be determined. If the two lasers 20 and 22 are a known fixed distance apart, as indicated by the distance 24, the individual lasers will determine the distance between each of them, respectively, and the respective near edges of the board, the distances being indicated at 26 and 28. With this information, the actual width of the board can be readily calculated by the system computer. The above two-laser system can produce up to 1,000 measurements (determinations) per second, providing a very accurate indication of the width of the board within the field of view of the lasers.

As indicated above, it is important for accurate measurements that the system be calibrated, i.e. that the distance 24 between the two lasers be very accurately known. The present method uses a calibration bar, which is indicated at 31 in FIGS. 3A and 3B. The dimensions of the calibration bar are precisely known, for example, 2.000 inches in one dimension and 4.000 inches in the orthogonal dimension, i.e. the length and width respectively of the calibration bar. These known dimensions are stored in the calibration portion of the system. The automatic system is always ready to recalibrate, as opposed to having to be activated to a recalibration mode, which is the case for many existing systems, including manual systems. The calibration bar 31 is positioned by an operator in the scan zone (typically on a conveyor belt) of the laser (the sawing process is interrupted and the belt is not moving) for a short time, e.g. a few seconds, and a measurement of the bar in one dimension is made by the laser system. The calibration bar is then turned by the operator 90° and left in that position for a few additional seconds, during which time measurements of the bar are again made.

The computer system software is programmed to recognize stationary objects within its field of view. If a second stationary object (i.e. one dimension thereof) appears within a few seconds of the first stationary object (another dimension of the same object) within the field of view of the laser, as would be the case for the turning of a calibration bar, and the difference between the two dimensions determined by the laser system closely matches the difference between the two stored dimensions of the calibration bar, then the system makes a conclusion that the object being measured is in fact a calibration bar and not, for instance, an actual sawn board. Recalibration of the system can then be safely carried out.

The distance between the two scanners 40, 41 is calculated based on actual scanner information, and the calculation carried out by the system is adjusted so that the dimensional determinations provided by the system is precisely the actual dimension of the calibration bar. The desired dimensions of sawn boards can thus be accurately determined, in the operation of the system.

Figure 3A:
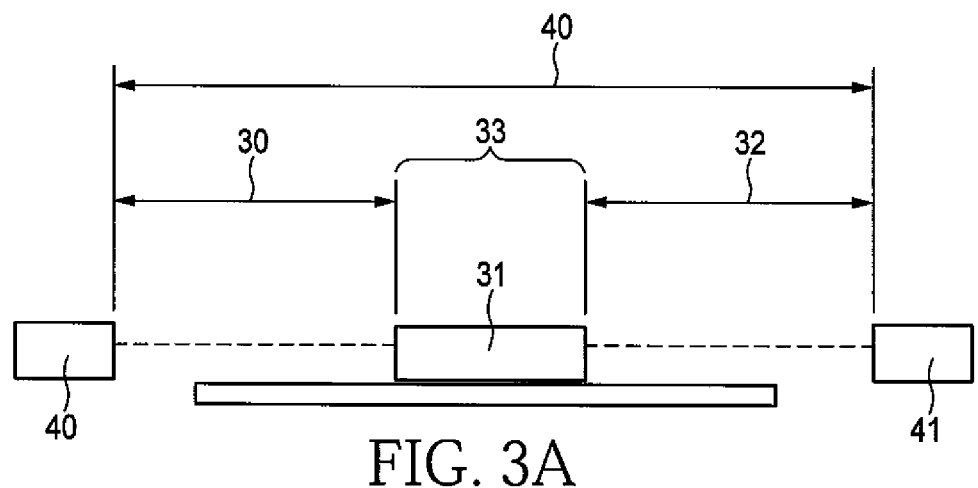
FIGS. 3A and 3B are diagrams illustrating scanning of a calibration bar with the system described herein.
Figure 3B:
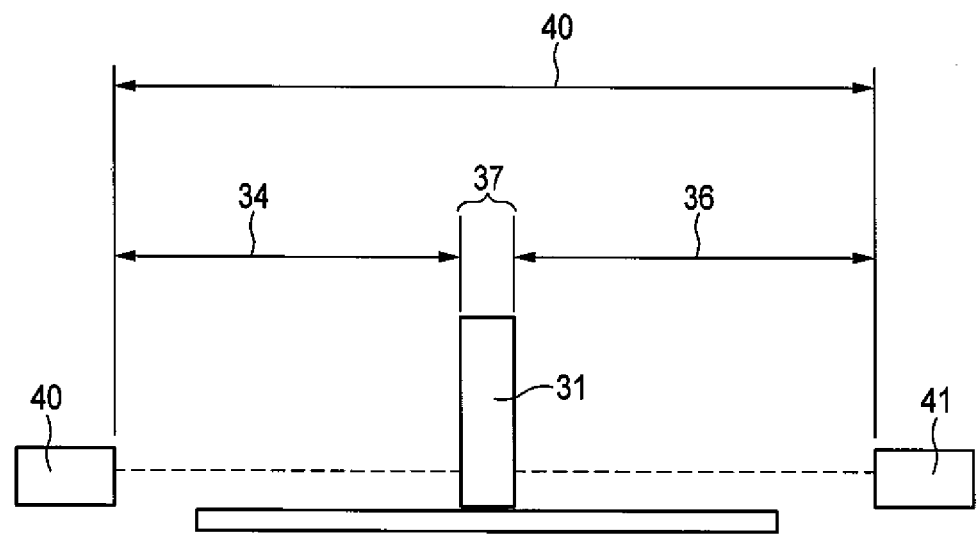

Again, in sequential steps, referring to FIGS. 3A and 3B, the system computer initially stores two known precise dimensions of the calibration bar. Then, with the sawing process interrupted, a calibration bar 31 is positioned in the field of view of the scanners 40, 41, the distances 30 and 32 are determined and dimension 33 is calculated by the computer system.

The operator then turns the calibration bar 900. The laser system now sees dimension 37 of the calibration bar, and that new dimension is then calculated, based on distance information 34, 36 from the lasers 40,41 to the bar 31. Dimensions 33 and 37 are stored, as are distances 34 and 36.

If the following calculation is true:

Distance 34+Distance 36−Distance 30−Distance 32=Dimension 33−Dimension 37 then the system knows that a calibration of its calculations to determine board size is appropriate. Distance 40 between the two scanners is calculated as follows:

Distance 40=Distance 30+Distance 32+Distance 33, or alternatively

Distance 34+Distance 36+Distance 37

As indicated above, with the present system, the calibration mode is enabled at all times, without the danger of accidentally calibrating from normal workpieces. When data reflecting the above calibration criteria is received, calibration of the system automatically occurs without any further instructions from the operator. Two lasers in a system can be set up any distance apart, and in a short time, the system will compute the distance between the two scanners.

In some situations, it may be desirable to add a second turn of the calibration bar, back to its original position, adding thus a third step of dimensional measurement to be performed. This additional step will further reduce the already slim possibility of confusing the calibration bar with an actual board or similar object.

Figure 4:
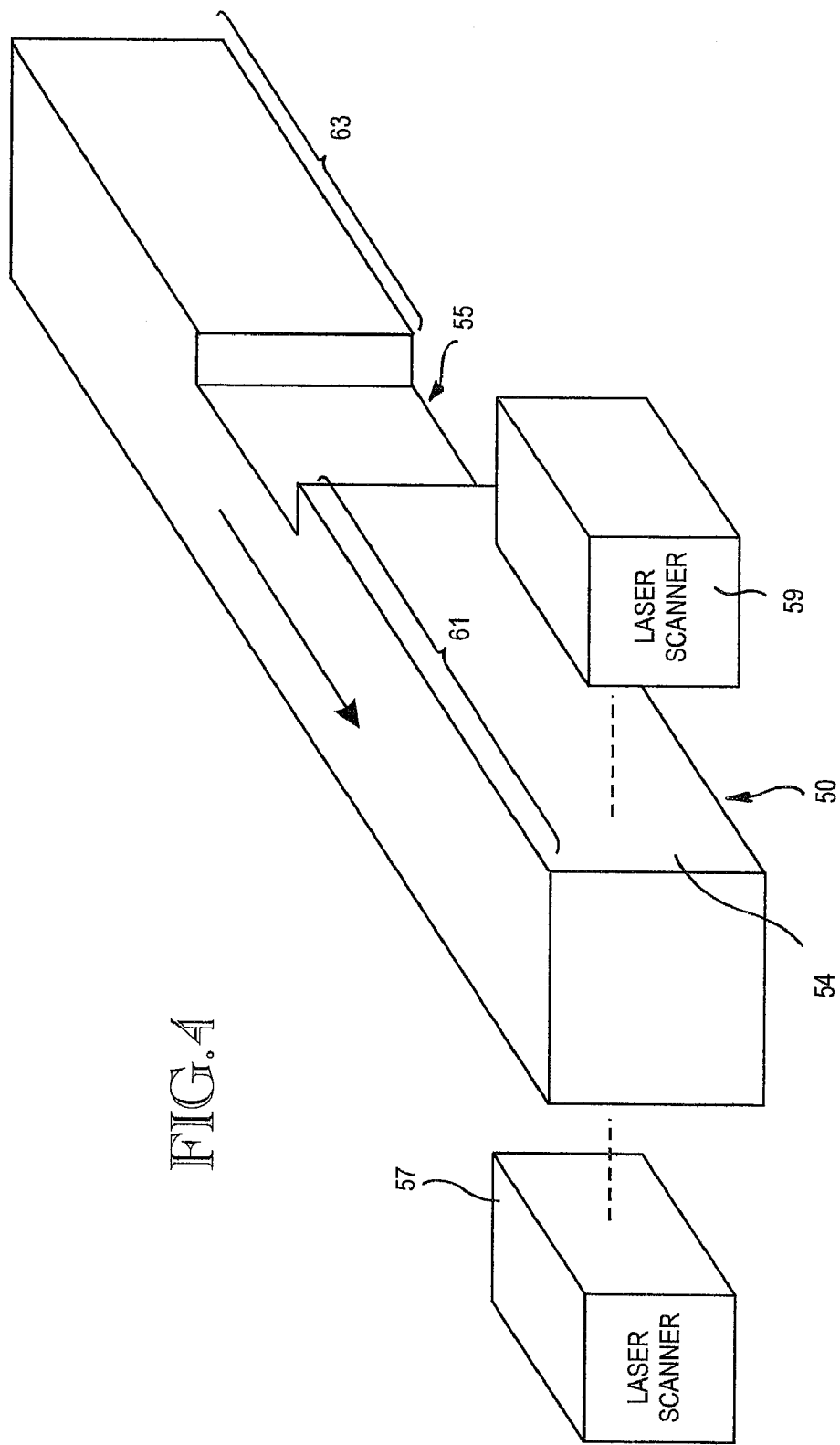
FIG. 4 is a diagram showing another embodiment of the scanning system described in connection with FIGS. 3A and 3B.

Another embodiment is shown in FIG. 4. FIG. 4 shows the use of a calibration bar 50 which is similar to the other calibration bars except that it has a precision notch 55 cut in it (in one side 54 in the embodiment shown) which extends completely across one dimension of the bar. The bar 50 is used in conjunction with lasers 57 and 59. In the calibration process, the sawmill operation will be temporarily shut down, as with the other calibration processes described above. The operator will place the calibration bar 50 on an outlet belt which would normally contain boards to be scanned, and will move the notched bar through the field of view of the lasers 57 and 59. The lasers will initially see a first portion 61 of the calibration bar. The dimension of portion 61 viewed by the scanners is precisely known. Measurements are made by the lasers and a determination is made as to the distance between lasers. The precision-cut notch portion 55 will then come into the field of view of the scanners. The precision-cut notch 55 has a precise dimension which is less than the corresponding dimension of portion 61. The same measurements and determinations are made for notch 55 as were made for portion 61. As the calibration bar is moved further through the field of view, scanners 57 and 59 will see portion 63 of the bar, which again has a precise, known dimension. The same measurements and determinations may be made as were made for portions 61 and notch 55, if desired.

The system computer is programmed such that when the sequence of known precise dimensions of the calibration bar for portions 61, 55 and 63 are recognized, calibration calculations are made, as discussed above. Adjustments to the dimensional calculations are then made, if necessary, from the determined value of the distance between the lasers. The sawing operation is then restarted with the desired dimension of the sawn lumber being determined using the new calibrations. Such a calibration process can be carried out frequently.

The sequence of precise dimensions of a calibration bar comprising a first dimensional portion 61 followed by a precision cut notch portion 55, followed by a second precision dimension portion 63, satisfies the reliability requirement that the item being measured is a calibration bar, and not a piece of sawn lumber. In many cases, the first dimensional portion and the notch portion may be sufficient, i.e. dimensional portion 63 is not necessary.

The use of the notch in a calibration bar eliminates the need for the operator having to turn the bar, as in the first embodiment discussed above. The notched bar method is thus simpler and somewhat faster for the operator.

Hence, a system/method of calibration for a measurement system, such as a measurement system for sawn boards in a sawmill using laser scanners, has been disclosed. The system is fast, effective and virtually guarantees that there will be no confusion between the calibration bar and actual objects to be measured.

Although a preferred embodiment of the invention has been disclosed for purposes of illustration, it should be understood that various changes, modifications and substitutions may be incorporated in the preferred embodiment without departing from the spirit of the invention which is defined by the claims which follow.

What is claimed is:

1. A method of calibration for single point laser systems which are used to calculate a selected dimension of an object, comprising the steps of:

storing at least two known dimensional aspects of a calibration bar member, the two known dimensional aspects being two separate dimensions of a calibration bar member which are sufficiently different that the system will not mistake a wood board for a calibration bar member, and wherein a second dimensional aspect is obtained by rotating the calibration bar approximately 90°;

placing the calibration bar in an original orientation within a scan zone of the laser system having two lasers with the scan zone therebetween;

determining the distance between each of the opposing lasers and the calibration bar in a first dimensional aspect;

presenting the second dimensional aspect of the calibration bar to the two lasers within the scan zone;

determining the distance between each of the two lasers, respectively, and the calibration bar in the second dimensional aspect;

using the determined distances and the known values of the first and second dimensional aspects of the calibration bar to ensure that a calibration bar is being viewed by the lasers instead of another object;

using the determined distance for the first and second dimensional aspects and the known dimensions of the calibration bar to obtain calibration information based on the distance between the two lasers; and calibrating the laser system based on the calibration information.

2. The method of claim 1, wherein the calibration information is obtained by adding the determined distances of the first dimensional aspect and the value of the first dimensional aspect and/or adding the determined distances of the second dimensional aspect and the value of the second known dimensional aspect and comparing the results, respectively, to the last known distance between the two lasers, wherein any difference therebetween is calibration information which is then used to calibrate the laser system.

3. The method of claim 1, wherein the object to be measured is a wood board produced in a sawmill operation.

4. The method of claim 1, including the additional step of moving the calibration bar back to its original orientation, determining the distance values from the two lasers to the calibration bar and using the distance values and the known dimension of the calibration bar to insure that the object being viewed is the calibration bar.

5. The method of claim 1, wherein the first dimensional aspect is a selected one dimension of the calibration bar and the second dimensional aspect is the one dimension reduced by a known cutout value.

* * * * *